United States Patent [19]
Kennedy et al.

[11] Patent Number: 6,055,126
[45] Date of Patent: Apr. 25, 2000

[54] DISC DRIVE HAVING HYDRODYNAMIC LABYRINTH SEAL AND MAGNET SHIELD

[75] Inventors: Michael D. Kennedy, Boulder Creek; Norbert S. Parsoneault, Scotts Valley, both of Calif.

[73] Assignee: Seagate Technology, Inc., Scotts Valley, Calif.

[21] Appl. No.: 09/111,127

[22] Filed: Jul. 6, 1998

[51] Int. Cl.[7] .................................................. G11B 17/02
[52] U.S. Cl. ........................................................ 360/99.08
[58] Field of Search .............................. 360/99.08, 98.07, 360/99.04, 97.02; 369/258, 261, 264, 269; 310/67 R, 90–91, 144

[56] References Cited

U.S. PATENT DOCUMENTS

| | | | |
|---|---|---|---|
| 3,283,905 | 11/1966 | Cass ........................................ | 210/222 |
| 3,800,914 | 4/1974 | Miyata .................................... | 184/6.25 |
| 4,365,656 | 12/1982 | Takahashi ............................... | 140/92.1 |
| 4,440,402 | 4/1984 | Pinkus et al. ........................... | 277/80 |
| 4,468,578 | 8/1984 | Takahashi ............................... | 310/198 |
| 4,618,806 | 10/1986 | Grouse ................................... | 318/254 |
| 4,630,943 | 12/1986 | Stahl et al. .............................. | 384/133 |
| 4,673,997 | 6/1987 | Gowda et al. .......................... | 360/107 |
| 4,759,842 | 7/1988 | Frees et al. ............................. | 210/94 |
| 4,767,954 | 8/1988 | Phillips .................................. | 310/12 |
| 4,779,165 | 10/1988 | Elsaesser et al. ....................... | 160/97 |
| 4,784,767 | 11/1988 | Hasuda et al. ......................... | 210/222 |
| 4,805,054 | 2/1989 | Kamoto et al. ........................ | 360/97.01 |
| 4,851,116 | 7/1989 | Tomita ................................... | 210/222 |
| 4,883,981 | 11/1989 | Gerfast .................................. | 310/40 |
| 4,934,836 | 6/1990 | Tanaka et al. ......................... | 384/100 |
| 4,938,611 | 7/1990 | Nii et al. ................................ | 384/133 |
| 4,965,476 | 10/1990 | Lin ........................................ | 310/51 |
| 4,985,792 | 1/1991 | Moir ...................................... | 360/99.08 |
| 5,011,165 | 4/1991 | Cap ........................................ | 277/80 |
| 5,013,947 | 5/1991 | Ide ......................................... | 310/67 |
| 5,031,061 | 7/1991 | Hatch ..................................... | 360/98.07 |
| 5,070,289 | 12/1991 | Pona, Jr. ................................ | 318/640 |
| 5,140,479 | 8/1992 | Elsing et al. .......................... | 360/97.01 |
| 5,141,338 | 8/1992 | Asada et al. ........................... | 384/114 |

(List continued on next page.)

FOREIGN PATENT DOCUMENTS 4-78315  3/1992  Japan .
4-103076  4/1992  Japan .

OTHER PUBLICATIONS

S. Prina and C. Taft, "The Design and Analysis of Brushless DC Motors Having Smooth Rotor Back Iron", pp. 75–100 (undated).

*DC Motors Speed Controls Servo Systems*, "Brushless DC Motors", Electro–Craft Corporation, Hopkins, MN, Chapter 6, pp. 6–5 —6–17 (1972).

(List continued on next page.)

*Primary Examiner*—Allen T. Cao
*Attorney, Agent, or Firm*—Westman, Champlin & Kelly, P.A.

[57] ABSTRACT

A disc drive system includes a disc drive chassis, a magnetic storage disc, a read/write transducer adjacent to the disc for reading and writing information on the disc, and a hydrodynamic bearing assembly. The hydrodynamic bearing assembly rotatably couples the magnetic storage disc to the disc drive chassis. The hydrodynamic bearing assembly includes a fluid path therethrough for circulating a fluid. A labyrinth seal and magnet shield is provided proximate the hydrodynamic bearing assembly.

16 Claims, 3 Drawing Sheets

U.S. PATENT DOCUMENTS

| | | |
|---|---|---|
| 5,142,173 | 8/1992 | Konno et al. .............................. 310/67 |
| 5,142,174 | 8/1992 | Ide ............................................ 310/67 |
| 5,215,385 | 6/1993 | Ide .......................................... 384/100 |
| 5,223,758 | 6/1993 | Kataoka et al. ........................... 310/90 |
| 5,224,782 | 7/1993 | Miwa et al. ............................. 384/100 |
| 5,246,294 | 9/1993 | Pan .......................................... 384/119 |
| 5,267,737 | 12/1993 | Cossete et al. ............................ 277/80 |
| 5,284,391 | 2/1994 | Diel et al. ................................ 384/108 |
| 5,295,028 | 3/1994 | Elsing ................................... 360/97.01 |
| 5,323,076 | 6/1994 | Hajec ....................................... 310/90 |
| 5,328,271 | 7/1994 | Titcomb .................................. 384/108 |
| 5,331,244 | 7/1994 | Rabe ....................................... 310/108 |
| 5,345,130 | 9/1994 | Kliman et al. .......................... 310/156 |
| 5,358,339 | 10/1994 | Konno et al. ........................... 384/107 |
| 5,366,298 | 11/1994 | Toshimitsu et al. .................... 384/107 |
| 5,367,416 | 11/1994 | Cossette et al. ...................... 360/97.02 |
| 5,376,850 | 12/1994 | Elsing et al. .............................. 310/67 |
| 5,376,851 | 12/1994 | Lipo et al. ............................... 310/179 |
| 5,376,852 | 12/1994 | Kawamura et al. .................... 310/198 |
| 5,389,252 | 2/1995 | Morrick .................................. 210/223 |
| 5,423,612 | 6/1995 | Zang et al. .............................. 384/119 |
| 5,427,456 | 6/1995 | Hensel ..................................... 384/112 |
| 5,440,185 | 8/1995 | Allwine, Jr. ............................ 310/156 |
| 5,441,647 | 8/1995 | Wascher et al. ........................ 210/695 |
| 5,457,588 | 10/1995 | Hattori et al. ........................ 360/99.04 |
| 5,458,785 | 10/1995 | Howe et al. ............................. 210/695 |
| 5,465,078 | 11/1995 | Jones, Jr. ................................. 335/305 |
| 5,473,484 | 12/1995 | Dunfield et al. ...................... 360/99.08 |
| 5,504,637 | 4/1996 | Asada et al. .......................... 360/98.07 |
| 5,510,664 | 4/1996 | Suzuki et al. ........................... 310/268 |
| 5,524,986 | 6/1996 | Leuthold et al. ....................... 384/119 |
| 5,600,511 | 2/1997 | Dunfielg et al. ..................... 360/98.07 |
| 5,600,514 | 2/1997 | Fukuzawa ............................ 360/98.07 |
| 5,712,746 | 1/1998 | Moir et al. ........................... 360/98.08 |
| 5,724,718 | 3/1998 | Moir et al. ........................... 360/98.08 |
| 5,732,458 | 3/1998 | Moir et al. ........................... 360/98.07 |
| 5,774,302 | 6/1998 | Elsaesser et al. .................... 360/98.07 |
| 5,877,916 | 3/1999 | Papst .................................... 360/98.07 |
| 5,880,545 | 3/1999 | Takemura et al. ................... 360/98.07 |
| 5,909,339 | 6/1999 | Hong .................................... 360/98.07 |

OTHER PUBLICATIONS

C. Veinott, *Theory and Design of Small Induction Motors*, "Air–Gap MMF and Flux Waves Set Up by a Single–Phase Winding", published by McGraw–Hill Company, Inc., New York, Chapter 14, pp. 265–281 (1959).

C. Veinott, *Theory and Design of Small Induction Motors*, "Air–Gap MMF Waves Set up by Polyphase Stator Windings", published by McGraw–Hill Company, Inc., New York, Chapter 15, pp. 282–290 (1959).

A.E. Fitzgerald, C. Kingsley, Jr. and S. Umans, *Fourth Edition —Electric Machinery*, "Rotating Machines: Basic Concepts", published by McGraw–Hill Company, Inc., New York, pp. 133–135 (1983).

T.H. Barton, J.C. Dunfield, *IEEE Transactions on Power Apparatus and Systems*, "Inductances of a Practical Slip–Ring Primitive", IEEE, vol. PAS–85/No. 2, pp. 140–159 (1966).

J.C. Dunfield, T.H. Barton, *Proceedings of The Institution of Electrical Engineers*, "Effect of m.m.f. and permeance harmonics in electrical machines —with special reference to a synchronous machine", The Inst. of Elect. Eng., Savoy Place, London WC2, vol. 114, No. 10, pp. 1443–1450 (1967).

Data Sheet, "Solving Design Problems with Synthetic Lubricants," published by Nye Lubricants, Inc., P.O. Box 8928, New Bedford, MA 02742 (undated), pp. 1–3.

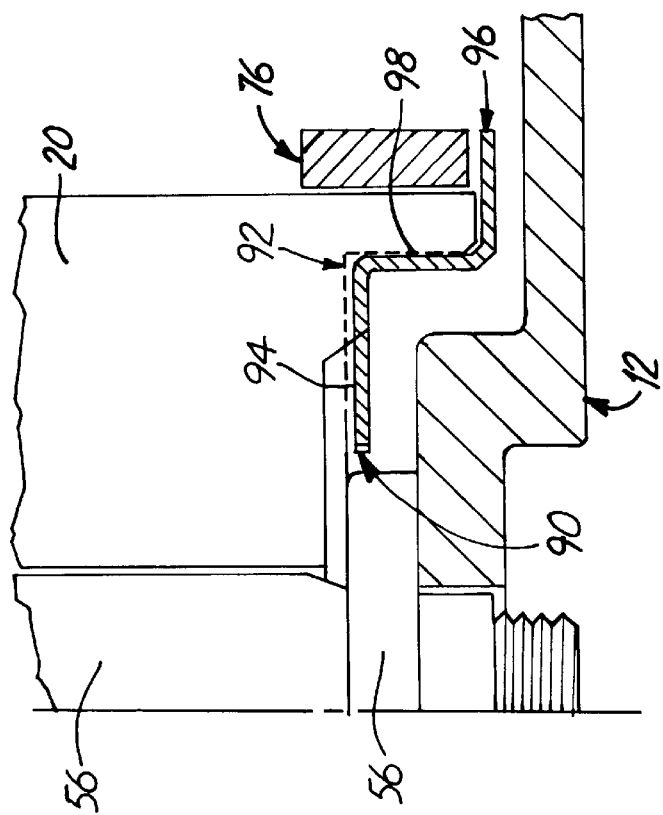
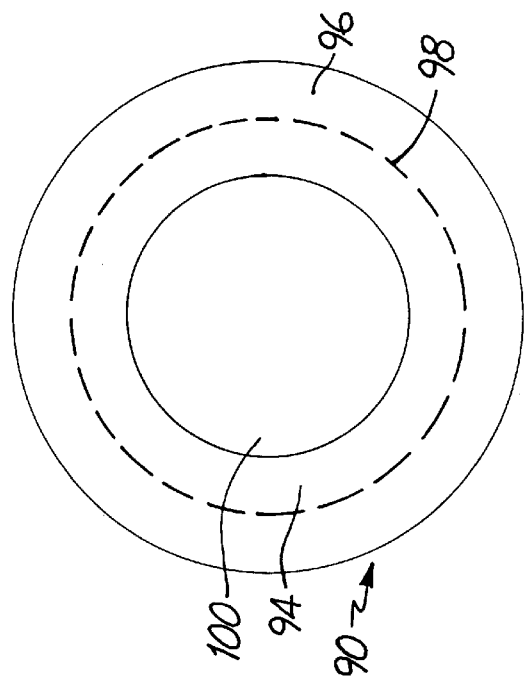

DISC DRIVE HAVING HYDRODYNAMIC LABYRINTH SEAL AND MAGNET SHIELD

BACKGROUND OF THE INVENTION

The present invention relates to disc drive systems for storing information. More specifically, the present invention relates to a hydrodynamic bearing assembly which provides support and rotation for a high speed spindle element.

The predominant trend in the disc drive industry for the past several years has been to increase track density in order to achieve increased data storage capacity. One of the difficulties which must be overcome in achieving this goal is the ability to maintain tracking position accuracy as the track density increases.

A major source of tracking position inaccuracy in a computer disc drive system is spindle bearing motion which is commonly referred to as "runout". Conventional spindle bearings include ball bearing assemblies which are prone to numerous mechanical problems, such as large runout, substantial wear, capacious manufacturing requirements, and the like.

A hydrodynamic bearing is an alternative to conventional ball bearing spindle systems. In a hydrodynamic bearing assembly, a lubricating fluid functions as the actual bearing surface between a stationary base and the rotating spindle or hub. The lubricating fluid typically includes either air or liquid. The rotating hub causes the fluid to circulate through the hydrodynamic bearing. When the hub is stationary, the fluid is at rest.

Hydrodynamic bearing assemblies suffer from a number of disadvantages. For example, the hydrodynamic fluid must be sealed within the spindle so that it does not escape into the disc environment. Further, tolerance between components can be very small, particularly for disc density drives. The components are relatively delicate and can be damaged during assembly.

SUMMARY OF THE INVENTION

A disc drive system includes a disc drive chassis, a magnetic storage disc, a read/write transducer adjacent to the disc for reading and writing information on the disc, and a hydrodynamic bearing assembly. The hydrodynamic bearing assembly rotatably couples the magnetic storage disc to the disc drive chassis. The hydrodynamic bearing assembly includes a fluid path therethrough for circulating a fluid. A labyrinth seal and magnet shield is provided proximate the hydrodynamic bearing assembly.

BRIEF DESCRIPTION OF THE DRAWINGS

FIG. 3 is a more detailed cross-sectional view showing the labyrinth seal and magnet shield of the present invention.

FIG. 4 is a top plan view of the labyrinth seal and magnet shield.

DETAILED DESCRIPTION OF THE PREFERRED EMBODIMENTS

Figure 1:
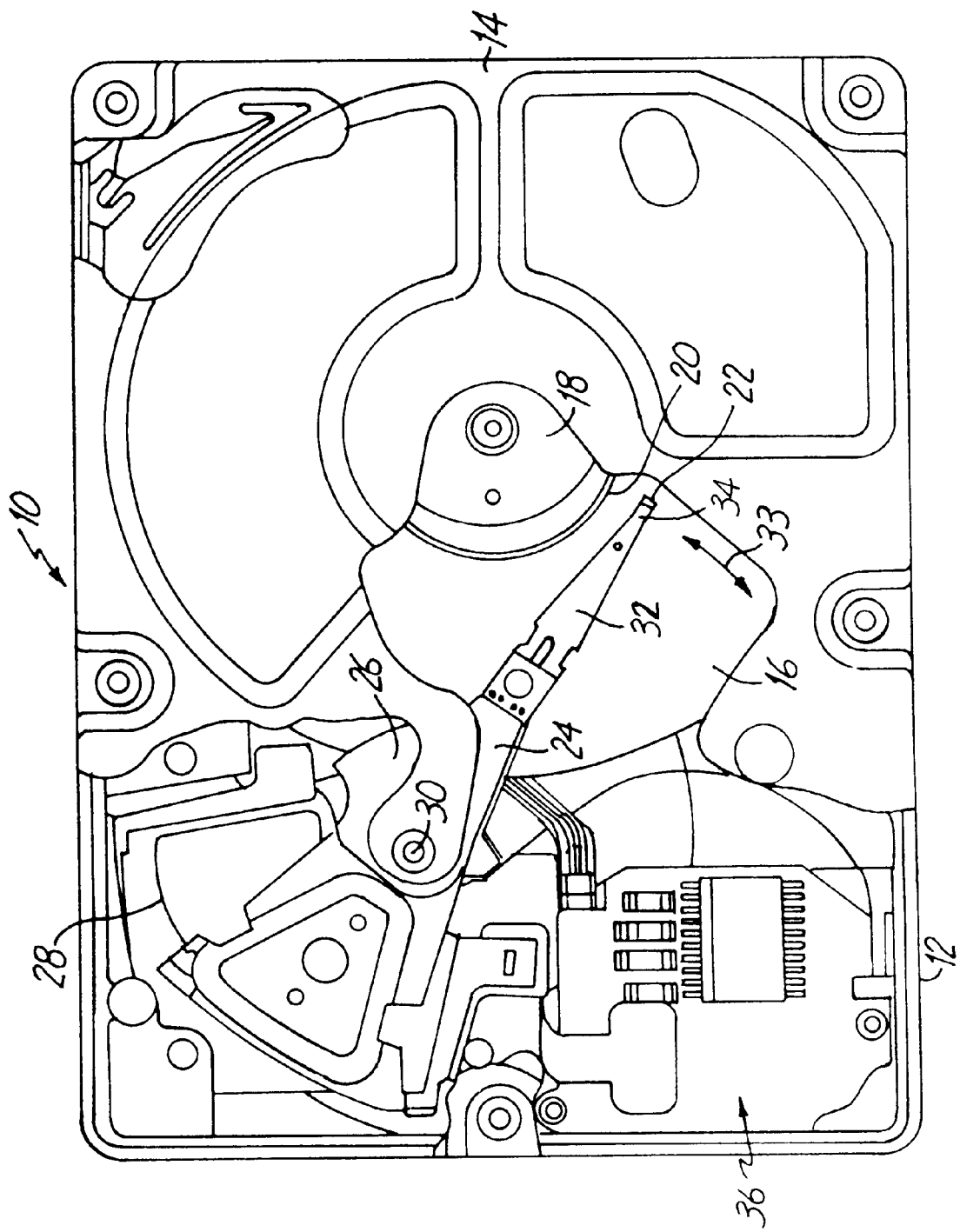
FIG. 1 is a top plan view of a magnetic disc drive including a labyrinth seal and magnet shield in accordance with the present invention.

FIG. 1 shows a plan view of a disc drive 10 for use with the present invention. Disc drive 10 includes a chassis member 12 to which internal components of the disc drive 10 are mounted. Chassis member 12 couples to top cover 14 which forms a sealed environment for critical parts of the disc drive 10.

Disc drive 10 includes at least one, but typically a plurality of discs 16 which are mounted for rotation on a spindle 18 having a bearing assembly (hub or sleeve) 20. The bearing assembly 20 is described in greater detail below. Typically, a plurality of magnetic read/write heads 22 are mounted to an actuator 24 having an actuator body 26 and an actuator motor 28. In the example shown at disc drive 10, actuator 24 is a rotary actuator which is mounted for pivoting about a pivot axis 30. Actuator 24 includes a number of head mounting arms 32 which couple the heads 22 to the actuator body 26 using a plurality of gimbal assemblies 34. Actuator motor 28 is coupled to actuator body 26 to provide a force to move the heads 22 to a desired position on the surface of the disc 16 through arc 33.

In operation, the spindle 18 causes disc 16 to rotate. Electronic circuitry 36 energizes the actuator motor 28 causing the actuator 24 to rotate about pivot axis 30 whereby the magnetic read/write head 22 is moved through arc 33 radially across the surface of the disc 16. Actuator 24 positions head 22 over a concentric track. This allows the electronic circuitry 36 to read back or write information at desired locations on disc 16.

Figure 2:
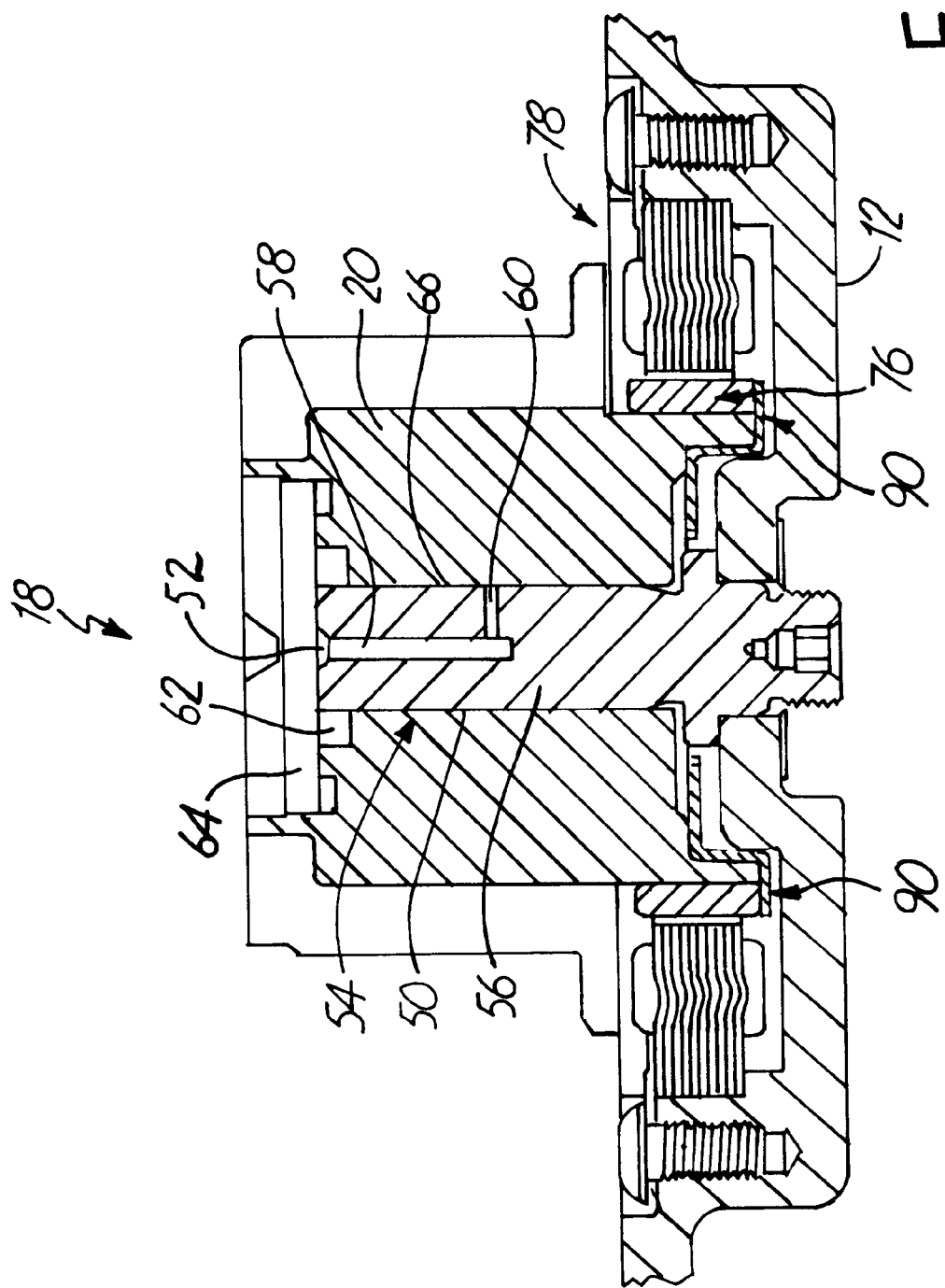
FIG. 2 is a cross-sectional view of a spindle motor of FIG. 1.

As shown in FIG. 2, the hub/sleeve 20 is rotatably coupled to a bearing assembly 54. The spindle motor 18 includes a stator assembly 78 preferably coupled to the chassis member 12 and a magnetized magnet 76 coupled to the hub/sleeve 20. Interaction between the stator assembly 78 and the magnet 76 causes the hub/sleeve 20 to rotate about the bearing assembly 54.

The bearing assembly 54 includes a shaft 56 connected to the chassis member 12. The shaft 56 includes a bore 58 and a side opening 60. A thrust plate 62 is connected to one end of the shaft 56 to secure the hub/sleeve 20 to the bearing assembly 54. A counterplate 64 is connected to the hub/sleeve 20 and covers the opening 52. Preferably, the inside diameter of the bore 50 is greater than the outside diameter of the shaft 56 so as to create a chamber 66 between the shaft 56 and the hub/sleeve 20. The chamber 66 is filled with a lubricating fluid which is used to form a hydrodynamic bearing. The fluid is sealed within the chamber 66.

When the hub/sleeve 20 is not rotating, the fluid within the chamber 66 is at rest. The counterplate 64 is in contact with the thrust plate 62 if the disc drive 10 (shown in FIG. 1) is in the horizontal position; or the shaft 56 is in contact with the hub/sleeve 20 if the disc drive 10 (shown in FIG. 1) is in the vertical position. When the hub/sleeve 20 is rotating, pressure differentials within chamber 66 cause the fluid to circulate through the chamber 66. The fluid circulates through the bore 58 and side openings 60 and around the shaft and thrust plate 62. When the hub/sleeve is rotating, the fluid suspends the counterplate 64 away from the thrust plate 62 such that the hub/sleeve can freely rotate about the shaft 56 and thrustplate 62.

FIG. 2 also shows a labyrinth seal and magnet shield 90 in accordance with one embodiment of the present invention. As shown in FIG. 2, shield 90 is configured to fit within one end of hub/sleeve 20 near magnet 76. FIG. 3 is a more detailed view of shield 90 in motor 18. Shield 90 fits in a cut out section 92 of hub/sleeve 20 and includes a raised inner diameter portion 94 and an outer diameter portion 96. Vertical section 98 extends between portions 94 and 96.

In one preferred embodiment, shield 90 is formed from thin aluminum and is press fit into cut out section 92. FIG.

4 is a top plan view of shield 90 showing sections 94, 96 and 98. An inner opening 100 fits around shaft 56. Preferably, the gap between shaft 56 and shield 90 is sufficiently small to form a labyrinth seal for any oil or other debris escaping from the capillary seal of the hydrodynamic bearing. Further, outer diameter portion 96 is positioned under magnet 76 to protect magnet 76 during manufacturing and assembly of the disc drive system.

Thus, shield 90 of the present invention may be easily implemented with existing spindle motors which employ hydrodynamic bearing. Further, the shield 90 protects the bottom side of magnet 76 from chipping during handling and assembly of the disc drive after magnet 76 has been mounted to hub/sleeve 20 but prior to final assembly.

The present invention offers a number of advantages over the prior art system. With the present invention, the magnet is protected such that the magnet is less likely to be damaged which could require the entire motor assembly to be replaced. Further, the invention provides additional sealing through a labyrinth seal such that evaporation of hydrodynamic fluid or other contaminants are inhibited so as to not contaminate the region containing the storage disc. Further, the invention can be easily retrofit with the existing designs. For example, the labyrinth seal and magnet shield on the invention can be fit into a recess region formed in a hub/sleeve of an existing motor design.

Although the present invention has been described with reference to preferred embodiments, workers skilled in the art will recognize that changes may be made in form and detail without departing from the spirit and scope of the invention. For example, the labyrinth seal and magnet shield of the present invention may be formed of any appropriate material and have any shape as desired for a particular motor configuration, and may be implemented in any shape or using any technique as desired. Materials include stainless steel, plated metal, plastic, aluminum, etc.

What is claimed is:

1. A disc drive system, comprising:

a disc drive chassis;

a storage disc;

a read/write transducer adjacent the disc for reading and writing information on the disc;

a motor having a hydrodynamic bearing assembly and a permanent magnet, the hydrodynamic bearing assembly rotatably coupling the storage disc to the disc drive chassis, the hydrodynamic bearing including a fluid path therethrough for circulating a fluid between a rotating member and a stationary member; and a shield between the stationary member and the rotating member, the shield coupled to the rotating member and configured to cover a portion of the permanent magnet to protect the permanent magnet from damage during assembly.

2. The disc drive system of claim 1 wherein the shield forms a gap between the rotating member and the stationary member, the gap of sufficient length and sufficiently small to form a labyrinth seal.

3. The disc drive system of claim 1 wherein the shield couples to a hub/sleeve of the motor.

4. The disc drive system of claim 3 wherein the hub/sleeve includes an annular cut out region adapted to receive the shield therein.

5. The disc drive system of claim 1 wherein the shield has an annular shape.

6. The disc drive system of claim 5 wherein the shield has an outer radius portion and an inner radius portion, the inner and outer radius portions substantially parallel and axially spaced apart.

7. The disc drive system of claim 1 wherein the shield couples to a hub/sleeve of the motor through a press fit.

8. The disc drive system of claim 1 wherein the shield comprises aluminum.

9. A motor for use in a disc drive system, comprising:

a chassis member;

a stationary member coupled to the chassis member;

a rotating member rotatably connected to the stationary member;

a hydrodynamic bearing assembly between the rotating member and the stationary member;

a stator assembly coupled to the chassis member;

a magnet attached to the rotating member and configured to interact with the stator assembly to rotate the rotating member; and a shield is located between the rotating member and the stationary member, the shield coupled to the rotating member and configured to cover a portion of the magnet during assembly.

10. The motor of claim 9, wherein the shield forms a gap between the rotating member and the stationary member, the gap of sufficient length and sufficiently small to form a labyrinth seal.

11. The motor claim 9 wherein the rotating member is a hub/sleeve.

12. The motor of claim 11 wherein the hub/sleeve includes an annular cut out region adapted to receive the shield therein.

13. The motor of claim 9 wherein the shield has an annular shape.

14. The motor of claim 13 wherein the shield has an outer radius portion and an inner radius portion, the inner and outer radius portions substantially parallel and axially spaced apart.

15. The motor of claim 11 wherein the shield couples to the hub/sleeve through a press fit.

16. The motor of claim 9 wherein the shield comprises aluminum.

* * * * *